US009481325B1

(12) United States Patent
Lange

(10) Patent No.: US 9,481,325 B1
(45) Date of Patent: Nov. 1, 2016

(54) CONTROL OF AN ACCESS OPENING IN A BODY OF A VEHICLE

(71) Applicant: GM GLOBAL TECHNOLOGY OPERATIONS LLC, Detroit, MI (US)

(72) Inventor: Richard J. Lange, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 14/692,030

(22) Filed: Apr. 21, 2015

(51) Int. Cl.

| | |
|---|---|
| ***B60J 5/04*** | (2006.01) |
| ***B60R 16/00*** | (2006.01) |
| ***B60J 5/10*** | (2006.01) |
| ***E05B 85/24*** | (2014.01) |
| ***E05B 79/10*** | (2014.01) |
| ***E05B 81/90*** | (2014.01) |

(52) U.S. Cl.
CPC ................ *B60R 16/005* (2013.01); *B60J 5/04* (2013.01); *B60J 5/10* (2013.01); *E05B 79/10* (2013.01); *E05B 81/90* (2013.01); *E05B 85/243* (2013.01)

(58) Field of Classification Search
CPC ............ B60R 16/005; B60J 5/04; B60J 5/10
USPC .......................................... 318/142, 141, 140
See application file for complete search history.

(56) References Cited

U.S. PATENT DOCUMENTS 5,688,019 A * 11/1997 Townsend .................. B60J 5/06 296/106
6,290,269 B1 * 9/2001 Bodley-Scott .......... E05B 81/25 292/216
2004/0232864 A1 * 11/2004 Sunaga ..................... H02P 7/29 318/434
2006/0023390 A1 * 2/2006 Spurr ...................... E05B 81/14 361/160
2011/0278867 A1 * 11/2011 Watanabe ............... E05B 81/06 292/341.16
2014/0070549 A1 * 3/2014 Hanaki ................... E05B 81/06 292/200
2014/0150581 A1 * 6/2014 Scheuring ................ B60J 5/047 74/89.38

FOREIGN PATENT DOCUMENTS

DE 102006041589 A1 * 3/2007 ............ E05B 81/14

* cited by examiner

*Primary Examiner* — Kawing Chan
(74) *Attorney, Agent, or Firm* — Quinn Law Group, PLLC

(57) ABSTRACT

A system for controlling access into a vehicle in the event of loss of electrical power is disclosed. The vehicle has an access opening into the vehicle's interior with a first door for access thereto, a cargo enclosure with a second door therefor, and an energy storage device for generating the electrical power. A first latch selectively latches and unlatches the first door, while a first switch operates the first latch. A second latch selectively latches and unlatches the second door, while an actuator connects the second door to the vehicle body and selectively opens and closes the second door. A second switch selectively connects a motor-generator to the energy storage device for operating the actuator in a first mode and disconnects the motor-generator from the energy storage device for generating electric current when the second door is operated manually to operate the first latch in a second mode.

20 Claims, 4 Drawing Sheets

CONTROL OF AN ACCESS OPENING IN A BODY OF A VEHICLE

TECHNICAL FIELD

The disclosure relates to a system for controlling an access opening in a body of a vehicle in the event of a power loss.

BACKGROUND

A typical vehicle has at least one side door to provide access for vehicle occupants to the vehicle's interior. Generally, such side doors are either hinged to swing-out relative to the vehicle body or are configured to slide relative thereto. Such a side door typically has a latch mechanism for maintaining the door in a closed state until access into or egress from the vehicle is required. The door latch mechanism is typically actuated by an outside door handle to gain access to the interior of the vehicle and by an interior door handle to permit the occupant to exit the vehicle interior.

Additionally, vehicles frequently have enclosed cargo areas that are positioned either at the front or at the rear end of the vehicle body. The design of such cargo enclosures typically includes a hinged cargo door, such as a deck-lid or a tailgate for security and convenient access. Generally, similar to latch mechanisms of the side doors, cargo enclosure doors employ latch mechanisms for maintaining the enclosure in a closed state until access thereto is required. In modern vehicles, latch mechanisms for both the side doors and cargo doors are frequently power actuated.

SUMMARY

A system for controlling access into a vehicle in the event of loss of electrical power is disclosed. The vehicle has a vehicle body that defines a vehicle interior and a vehicle exterior, and an access opening defined by the vehicle body and configured to provide access to the vehicle interior. The vehicle also has a first door configured to selectively cover and uncover at least a portion of the access opening, a cargo enclosure defined by the body, a second door configured to selectively cover and uncover at least a portion of the cargo enclosure, and an energy storage device for generating the electrical power. The system includes a first latch configured to selectively latch and unlatch the first door. The system also includes a first switch in electrical communication with the first latch and the energy storage device and configured to operate the first latch. The system additionally includes a second latch configured to selectively latch and unlatch the second door.

The system also includes an actuator connecting the second door to the vehicle body and configured to operate the second door for selectively opening and closing the cargo enclosure. The system additionally includes a motor-generator mounted to the vehicle body. The motor-generator operates as an electric motor when connected to the actuator to thereby selectively cover and uncover the at least a portion of the cargo enclosure and can operate as a generator to release the first latch. Furthermore, the system includes a second switch configured to selectively connect the motor-generator to the energy storage device for operating the actuator in a first mode and disconnect the motor-generator from the energy storage device for generating electric current when the second door is operated manually to operate the first latch in a second mode.

The second switch may be configured as a four pole/double throw switch.

The system may also include a bridge rectifier configured to convert the generated electric current to flow in one direction for operating the first latch in the second mode, both when the second door is opened and when the second door is closed.

The actuator may be configured as a spindle drive.

The system may additionally include a device configured to release the second latch via manual operation.

The system may also include a mechanism configured to disable operation of the first latch. In such a case, operation of the motor-generator in the second mode may be configured to override the mechanism and enable operation of the first latch.

The mechanism may be at least one of a child lock configured to disable operation of the first latch from the vehicle interior and a double-lock configured to disable operation of the first latch from each of the vehicle interior and the vehicle exterior.

The second switch may be mounted to one of the vehicle body, inside the cargo enclosure, and the second door, such as on an inside surface of the second door.

The motor-generator may be mounted to one of the vehicle body, inside the cargo enclosure, and the second door, for example on an inside surface of the second door.

The cargo enclosure may be configured as a trunk and the second door may then be configured as a deck lid.

The second door may be configured as a tailgate hinged to the vehicle body for substantially vertical pivotable movement, i.e., a liftgate.

The second door may also be configured as a tailgate hinged to the rear portion of the vehicle body for substantially horizontal pivotable movement, i.e., a swing-out door.

A vehicle employing such a system is also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
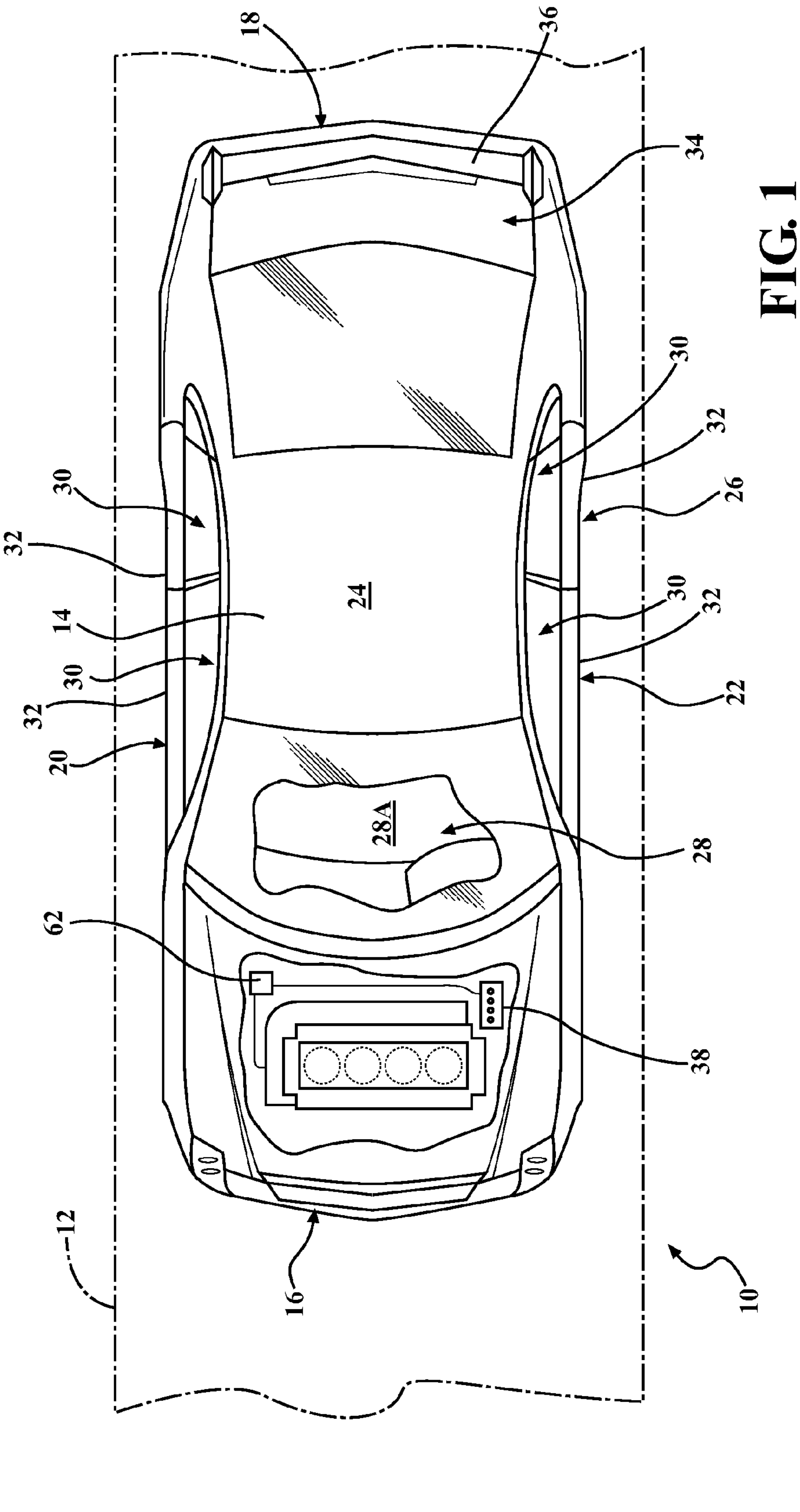
FIG. 1 is a schematic top view of a vehicle having a passenger compartment and a cargo enclosure with respective access doors according to the present disclosure.

Referring to the drawings, wherein like reference numbers refer to like components, FIG. 1 shows a schematic view of a motor vehicle 10 positioned relative to a road surface 12. The vehicle 10 includes a vehicle body 14. The vehicle body 14 defines six body sides. The six body sides include a first body end or front end 16, an opposing second body end or rear end 18, a first lateral body side or left side 20, a second lateral body side or right side 22, a top body portion 24, which may include a vehicle roof, and an underbody portion (not shown). The left side 20 and right side 22 are disposed generally parallel to each other and with respect to a virtual longitudinal axis X of the vehicle 10, and span the distance between the front end 16 and the rear end 18. The vehicle 10 also includes a system for controlling access into the subject vehicle in the event of loss of electrical power, which will be described in detail below.

The body sides 16, 18, 20, 22, 24, together with the underbody portion define a vehicle exterior 26. The body 14 also defines a vehicle interior 28 that includes a passenger compartment 28A. The passenger compartment 28A is adapted to accommodate vehicle passengers and their belongings. As shown in FIG. 1, the vehicle 10 also includes at least one access opening 30 that is defined by the body 14 and provides access to the vehicle interior 28. As shown, the vehicle body 14 defines four individual access openings 30. The vehicle 10 also includes a first door 32 for each of the access openings 30. Each first door 32 is configured to selectively cover and uncover at least a portion of the respective access opening 30 in order to control passage between the vehicle exterior 26 and the vehicle interior 28. The vehicle 10 also includes a cargo enclosure 34 that is defined by the body 14. A second door 36 is configured to selectively cover and uncover at least a portion of the cargo enclosure 34.

Figure 2:
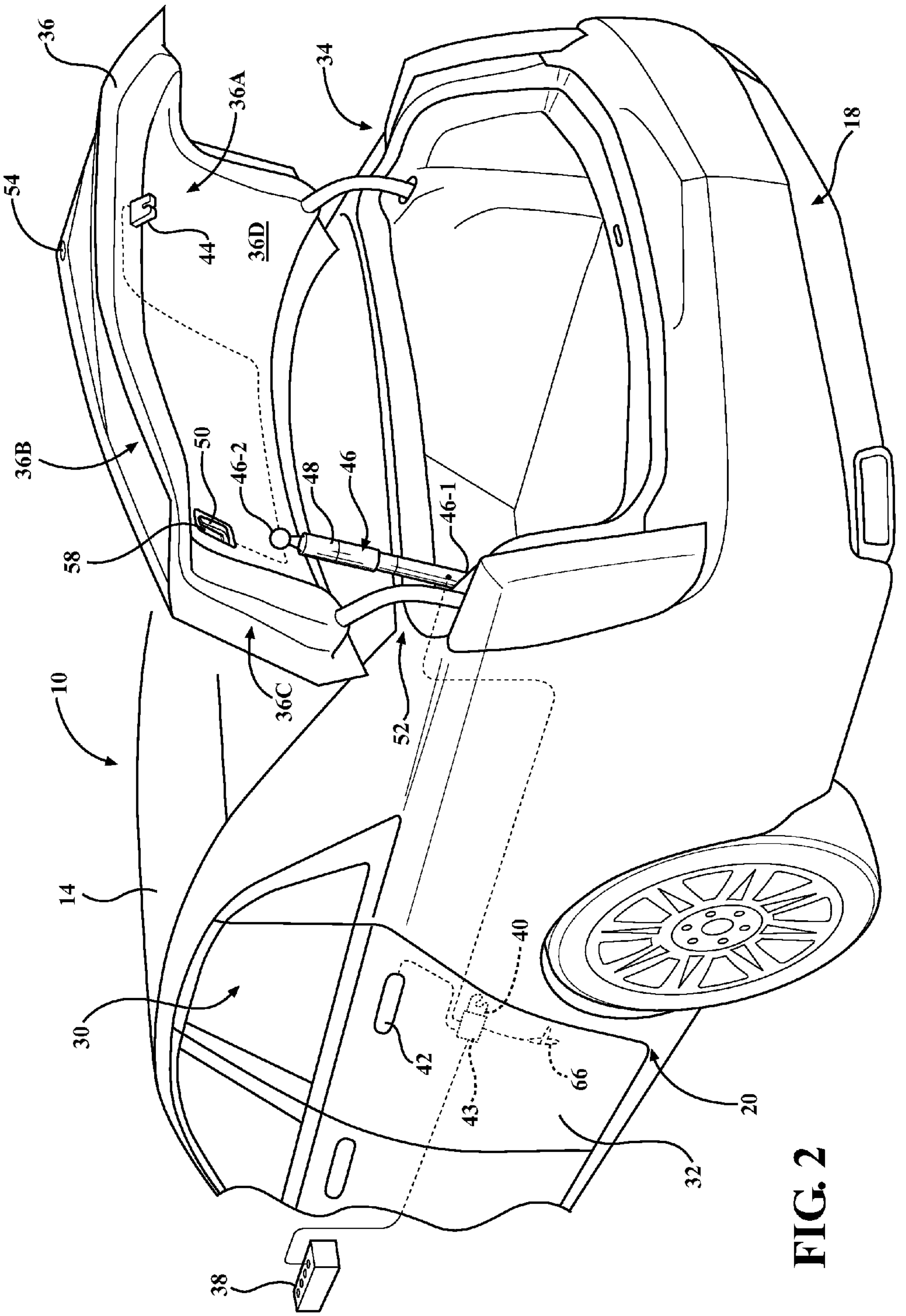
FIG. 2 is a partial perspective rear view of an example vehicle having a system for controlling access thereto, illustrating a three-box sedan body style having a fully-enclosed trunk and a deck lid for covering thereof.

The cargo enclosure 34 may be configured as a separate compartment, such as a fully-enclosed trunk, for instance in a traditional three-box sedan body style, while the second door 36 may be configured as a hinged deck lid, as shown in FIG. 2. The second door 36 may also be configured as a tailgate (shown in FIG. 3) for a fully or partially-enclosed trunk, wherein at least one side of the trunk is open to the passenger compartment 28A. As shown, the tailgate-type of a second door 36 is hinged at the rear end 18 of the vehicle body 14 for substantially vertical pivotable movement, such as a liftgate. Additionally, the second door 36 may be configured as a tailgate hinged to the rear end 18 of the vehicle body 14 for substantially horizontal pivotable movement, such as a swing-out door (not shown). Although the cargo enclosure 34 is primarily described and shown throughout the Figures as being arranged at the rear 18 of the vehicle body 14, such a cargo enclosure may also be arranged proximate the front end 16. Such a front-positioned cargo enclosure 34 (not shown) may, for example, be used in a rear-engine or a mid-engine vehicle, as understood by those skilled in the art. The disclosed tailgate is of the type that is frequently used for access to the interiors and storage compartments in vans, station wagons, and sport utility vehicles (SUVs).

The vehicle 10 also includes an energy storage device 38 (shown in FIG. 1), such as a battery, for generating electrical power used to operate various vehicle systems, such as powertrain, lighting, and heating, ventilation, and air conditioning (HVAC). As shown in FIG. 2, the vehicle 10 also includes a first latch 40 for each of the first doors 32. Each first latch 40 is configured to selectively latch and unlatch the first door 32. The first latch 40 may be additionally configured to selectively lock and unlock the first door 32, thus selectively disabling and enabling operation of the first door. The vehicle 10 also includes a first switch 42 in electrical communication with each of the first latch 40 and the energy storage device 38. The first switch 42 is configured to operate the first latch 40 via an electric motor 43 in connection with the energy storage device 38. Accordingly, each first latch 40 is power operated to facilitate access to the respective access openings 30 via first doors 32 by using the electrical power generated by the energy storage device 38. The first switch 42 may be configured as a door handle, a pushbutton, or any other device that may be conveniently operated to gain access to the passenger compartment 28A.

Figure 3:
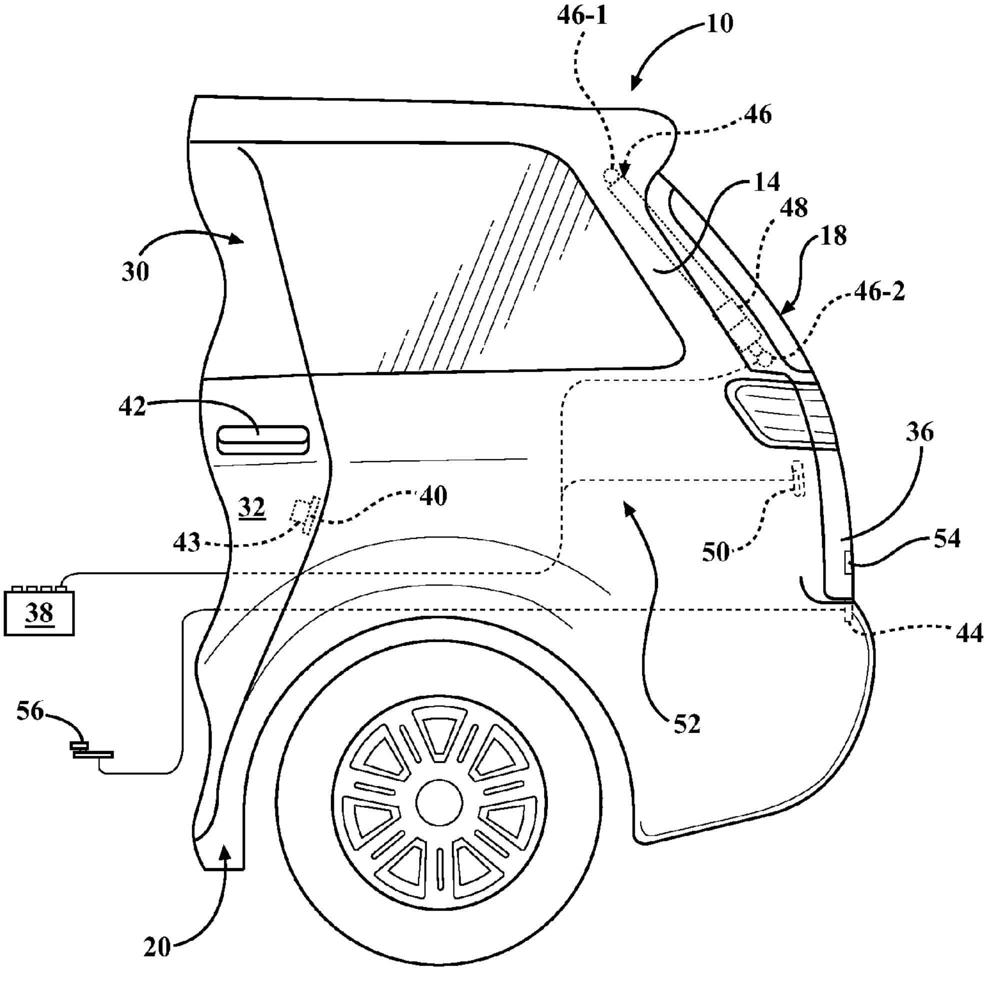
FIG. 3 is a partial rear view of an alternative embodiment of the vehicle having the system for controlling access thereto, illustrating an example of a hatchback body style having a partially-enclosed trunk and a tailgate for covering thereof.

Additionally, the vehicle 10 also includes a second latch 44 configured to selectively latch and unlatch the second door 36 and an actuator 46. The second latch 44 may be additionally configured to selectively lock and unlock the second door 36, thus selectively disabling and enabling operation of the second door. The actuator 46 connects the second door 36 to the vehicle body 14 and is configured to operate or move the second door for selectively opening and closing the cargo enclosure 34. The actuator 46 may be configured as a spindle drive, as shown in FIGS. 2 and 3. Either one or a plurality of such actuators 46 may be used to operate the second door 36. Each such actuator 46 is operatively connected to the vehicle body 14 via a first end 46-1, and to the second door 36 via a second end 46-2. As understood by those skilled in the art, a spindle drive utilizes a lead screw to translate radial motion into linear motion. In place of the described spindle drive, other devices that are capable of translating radial motion into linear motion, such as a rack and pinion, may also be employed for each actuator 46.

As shown in FIGS. 2 and 3, the actuator 46 includes a motor-generator 48. The motor-generator 48 of the actuator 46 is power operated to facilitate access to the cargo enclosure 34 via the second door 36 by using the electrical power generated by the energy storage device 38. A second switch 50 is arranged on the vehicle 10 and configured to selectively connect the motor-generator 48 to and disconnect the motor-generator from the energy storage device 38. The second switch 50 may be mounted to either the vehicle body 14, inside the cargo enclosure 34 (as shown in FIG. 2), or to the second door 36, such as on an inside surface 36A (as shown in FIG. 3). The second switch 50 may be configured as a four pole/double throw (4PDT) switch.

As understood by those skilled in the art, a 4PDT switch is a transfer switch that is designed to power an electric load selectively from multiple sources. Double throw means the switch can be placed into two distinct "on" positions, P1 and P2 (an "off" position is not counted). Four pole means the switch transfers four line wires, i.e., poles. The 4PDT switch is configured to disconnect the electric load from an electric power source before connecting the load to another power source. In the specific embodiment of the second switch 50, the P1 position may be one that connects the motor-generator 48 to the energy storage device 38 and the P2 position may disconnect the motor-generator 48 from the energy storage device. The second switch 50 may also be configured as a combination of multiple switches, such as a pair of double pole/double throw (DPDT) switches, each of which transfers two line wires or poles.

A system 52 for controlling access into the vehicle 10 in the event of loss of electrical power from the energy storage device 38 includes each of the first latch 40, first switch 42, second latch 44, the actuator 46, the motor-generator 48, and the second switch 50. The system 52 selectively operates the motor-generator 48 either as an electric motor or as a generator. The second switch 50 connects the motor-generator 48 to the energy storage device 38 for operating the actuator 46 in a first mode, wherein the motor-generator drives the actuator 46. The second switch 50 is also configured to disconnect the motor-generator 48 from the energy storage device 38 for generating electric current when the second door 36 is operated manually. Such manual operation of the second door 36 drives the motor-generator 46 as a generator via the actuator 46 for operating the first latch 40 in a second mode. Accordingly, the motor-generator 48 operates as an electric motor when connected to the actuator 46 and the energy storage device 38 to thereby selectively cover and uncover the cargo enclosure 34, and, in the event of loss of electrical power, operates as a generator to release the first latch 40 when manually driven via the second door 36.

As shown in FIG. 2, the system 52 may also include a device 54 configured to release the second latch 44 via manual operation. For example, the device 54 may be configured as a key-lock (shown in FIG. 2) and/or a mechanical lever (shown in FIG. 3) that is accessible from the vehicle exterior 26. The device 54 may be positioned on an exterior surface 36B of the second door 36, such that an operator may manually trigger opening of the second door from outside the vehicle 10. In addition to being manually operated by the device 54, the second latch 44 may be power actuated via a separate switch 56 that is arranged inside the passenger compartment 28A, as shown in FIG. 3.

As shown in FIG. 2, the second door 36 may include a feature 58 on the inside surface 36A, such as a specifically configured handle, pad, or depression. The feature 58 is configured to provide a convenient location for the operator to apply a force for manually opening the second door 36, such as proximate to a side edge 36C of the second door. In the event the second door 36 includes a trim panel 36D (shown in FIG. 2) arranged on the inside surface 36A, the feature 58 may be incorporated into such a trim panel. The second switch 50 may be arranged proximate to the feature 58, such as adjacent to or part of the pad, or in the depression.

Figure 4:
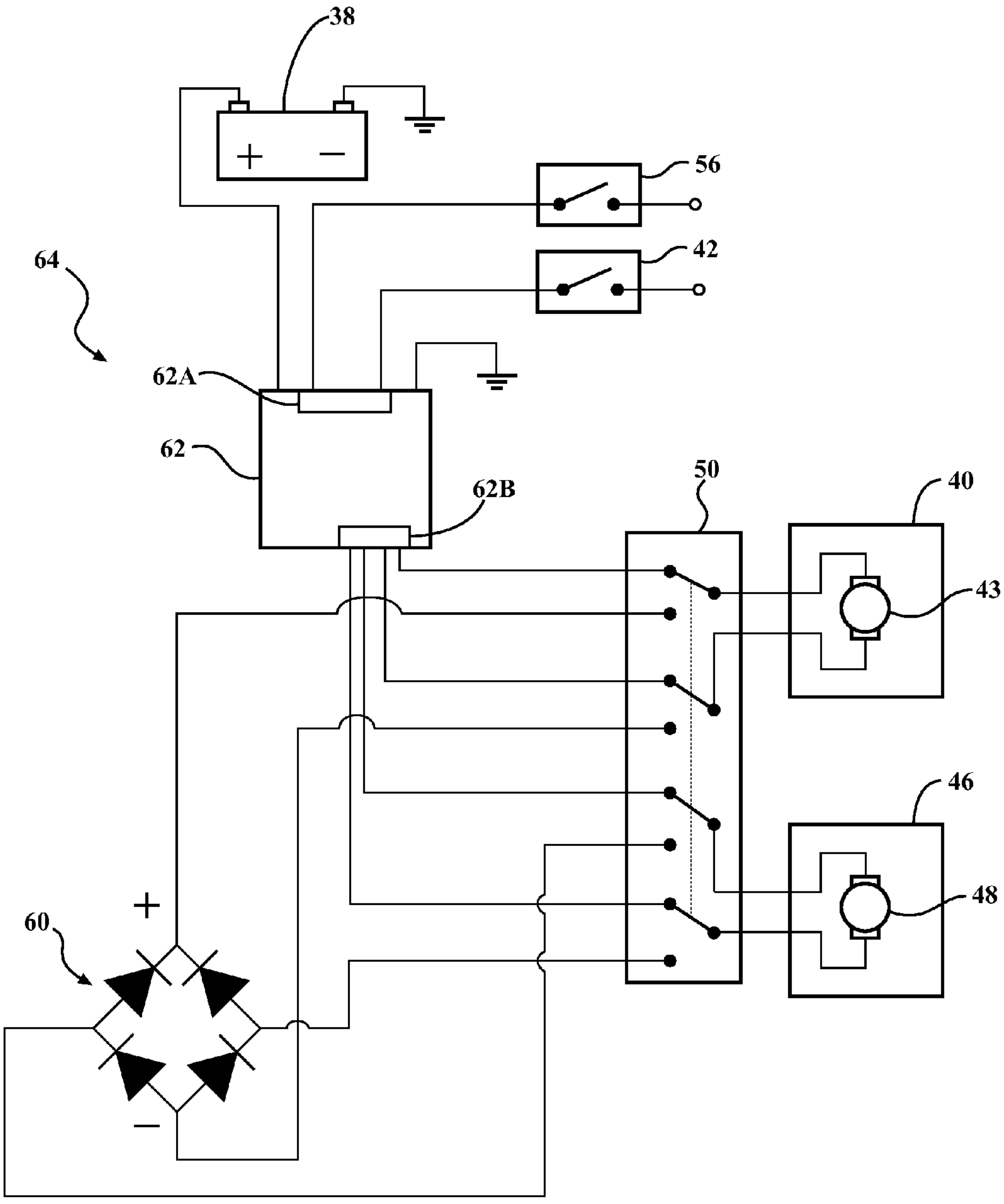
FIG. 4 is a schematic illustration of an example electrical circuit showing connections of various components of the system according to the present disclosure.

The system 52 may additionally include a bridge rectifier 60 as part of an electrical circuit 64 (shown in FIG. 4) that includes the second switch 50, the motor-generator 48, and the energy storage device 38. The bridge rectifier 60 is configured to convert the electric current generated by the motor-generator 48 in the second mode to flow in one direction for operating the first latch 40 via the second switch 50, both when the second door 36 is manually opened and manually closed. As shown in FIGS. 1 and 4, the system 52 may also include an Electronic Control Module (ECM) 62 that controls various components of the system 52. The ECM 62 includes an input block 62A for electrical input from the energy storage device 38, the first switch 42, and the switch 56, as well as an output block 62B for electrical output to the second switch 50. FIG. 4 schematically illustrates the electrical circuit 64 that includes connections between various components of the system 52.

The system 52 may additionally include a mechanism 66 that functions to disable operation of the first latch 40. The mechanism 66 may be configured as a child lock that disables operation of the first latch 40 from the passenger compartment 28A, thereby ensuring that children do not inadvertently release the first latch at an inopportune instance. The mechanism 66 may be configured as a double-lock configured to disable operation of the first latch 40 from each of the passenger compartment 28A and the vehicle exterior 26. Such a double-lock mechanism 66 can function as both a child lock and as a means to thwart unauthorized entry into the vehicle, as understood by those skilled in the art. As part of operating the motor-generator 48 in the second mode, the system 52 may be configured to override the mechanism 66 and enable operation of the first latch 40.

Accordingly, in the event of loss of electrical power from the energy storage device 38, the system 52 permits an operator to initially open the second door 36 via the device 54. Then, following the second switch 50 being transferred from the P1 position to the P2 position, manual lifting of the second door 36 will result in driving the motor-generator 48 in generator mode and operating the actuator 46 in the second mode. Thus, driving the motor-generator 48 as a generator provides electrical current to power one or more of the first latches 40 in order to gain access into the vehicle 10 through the respective first door 32 even if the electrical power from the energy storage device 38 is insufficient.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system for controlling access into a vehicle in the event of loss of electrical power, the vehicle having a vehicle body that defines a vehicle interior and a vehicle exterior, an access opening defined by the vehicle body and configured to provide access to the vehicle interior, a first door configured to selectively cover and uncover at least a portion of the access opening, a cargo enclosure defined by the vehicle body, a second door configured to selectively cover and uncover at least a portion of the cargo enclosure, and an energy storage device for generating the electrical power, the system comprising:

- a first latch configured to selectively latch and unlatch the first door;
- a first switch in electrical communication with the first latch and the energy storage device and configured to operate the first latch;
- a second latch configured to selectively latch and unlatch the second door;
- an actuator connecting the second door to the vehicle body and configured to operate the second door for selectively opening and closing the cargo enclosure;
- a motor-generator mounted to the vehicle body; and
- a second switch configured to selectively connect the motor-generator to the energy storage device for operating the actuator in a first mode and disconnect the motor-generator from the energy storage device for generating electric current when the second door is operated manually to operate the first latch in a second mode.

2. The system of claim 1, wherein the second switch is configured as a four pole/double throw switch.

3. The system of claim 1, further comprising a bridge rectifier configured to convert the generated electric current to flow in one direction for operating the first latch in the second mode when the second door is opened and when the second door is closed.

4. The system of claim 1, wherein the actuator is configured as a spindle drive.

5. The system of claim 1, further comprising a device configured to release the second latch via manual operation.

6. The system of claim 1, further comprising a mechanism configured to disable operation of the first latch, wherein operation of the motor-generator in the second mode is configured to override the mechanism and enable operation of the first latch.

7. The system of claim 6, wherein the mechanism is at least one of a child lock configured to disable operation of the first latch from the vehicle interior and a double-lock configured to disable operation of the first latch from each of the vehicle interior and the vehicle exterior.

8. The system of claim 1, wherein the second switch is mounted to one of the vehicle body, inside the cargo enclosure, and the second door, on an inside surface of the second door.

9. The system of claim 1, wherein the motor-generator is mounted to one of the vehicle body, the cargo enclosure, and the second door.

10. The system of claim 1, wherein the cargo enclosure is a trunk and the second door is configured as a deck lid.

11. A vehicle comprising:

a vehicle body defining a vehicle interior and a vehicle exterior;

an energy storage device mounted to the vehicle body;

an access opening defined by the vehicle body and configured to provide access to the vehicle interior;

a first door configured to selectively cover and uncover at least a portion of the access opening and having a first latch configured to selectively latch and unlatch the first door;

a first switch in electrical communication with the first latch and the energy storage device and configured to operate the first latch;

a cargo enclosure defined by the body;

a second door configured to selectively cover and uncover at least a portion of the cargo enclosure and having a second latch configured to selectively latch and unlatch the second door;

an actuator connecting the second door to the vehicle body and configured to operate the second door for selectively opening and closing the cargo enclosure;

a motor-generator mounted to the vehicle body; and a second switch configured to selectively connect the motor-generator to the energy storage device for operating the actuator in a first mode and disconnect the motor-generator from the energy storage device for generating electric current when the second door is operated manually to operate the first latch in a second mode.

12. The vehicle of claim 11, wherein the second switch is configured as a four pole/double throw switch.

13. The vehicle of claim 11, further comprising a bridge rectifier configured to convert the generated electric current to flow in one direction for operating the first latch in the second mode when the second door is opened and when the second door is closed.

14. The vehicle of claim 11, wherein the actuator is configured as a spindle drive.

15. The vehicle of claim 11, further comprising a device configured to release the second latch via manual operation.

16. The vehicle of claim 11, further comprising a mechanism configured to disable operation of the first latch, wherein operation of the motor-generator in the second mode is configured to override the mechanism and enable operation of the first latch.

17. The vehicle of claim 16, wherein the mechanism is at least one of a child lock configured to disable operation of the first latch from the vehicle interior and a double-lock configured to disable operation of the first latch from each of the vehicle interior and the vehicle exterior.

18. The vehicle of claim 11, wherein the second switch is mounted to one of the vehicle body, the cargo enclosure, and the second door.

19. The vehicle of claim 11, wherein the motor-generator is mounted to one of the vehicle body, inside the cargo enclosure, and the second door, on an inside surface of the second door.

20. The vehicle of claim 11, wherein the cargo enclosure is a trunk and the second door is configured as a deck lid.

* * * * *